United States Patent [19]

Schnittjer

[11] Patent Number: 4,976,095
[45] Date of Patent: Dec. 11, 1990

[54] COMPOST WINDROW TURNER

[75] Inventor: Bradley J. Schnittjer, Delhi, Iowa

[73] Assignee: American Trencher, Inc., Delhi, Iowa

[21] Appl. No.: 347,823

[22] Filed: May 5, 1989

[51] Int. Cl.$^5$ ............... A01D 43/04; A01D 61/02
[52] U.S. Cl. ............................ 56/350; 56/209; 56/372
[58] Field of Search ............. 56/192, 209, 208, 218, 56/228, 350–353, 372

[56] References Cited

U.S. PATENT DOCUMENTS

| | | | |
|---|---|---|---|
| 936,733 | 10/1909 | McMahon | 56/192 |
| 1,001,168 | 8/1911 | Roosa | 56/350 |
| 2,513,480 | 7/1950 | Heth | 56/1 X |
| 2,751,745 | 6/1956 | Magee | 56/192 X |
| 4,099,364 | 7/1978 | Kanengieter et al. | 56/192 X |
| 4,739,610 | 4/1988 | Schultz | 56/192 X |

Primary Examiner—Hoang C. Dang
Attorney, Agent, or Firm—James C. Nemmers

[57] ABSTRACT

A compost windrow turner that uses an elevating conveyor to pick up, mix and aerate the composted material and then redeposit the material. The machine is moved by attachment to the loader bucket of a tractor which then moves and controls the operation of the machine. The machine is firmly held in place by a clamping mechanism that is hydraulically powered. The tractor can also be used to transport the machine or load it onto a transport carrier. The machine also has an attachment for separating plastic trash bags from their contents as they pass through the machine.

9 Claims, 4 Drawing Sheets

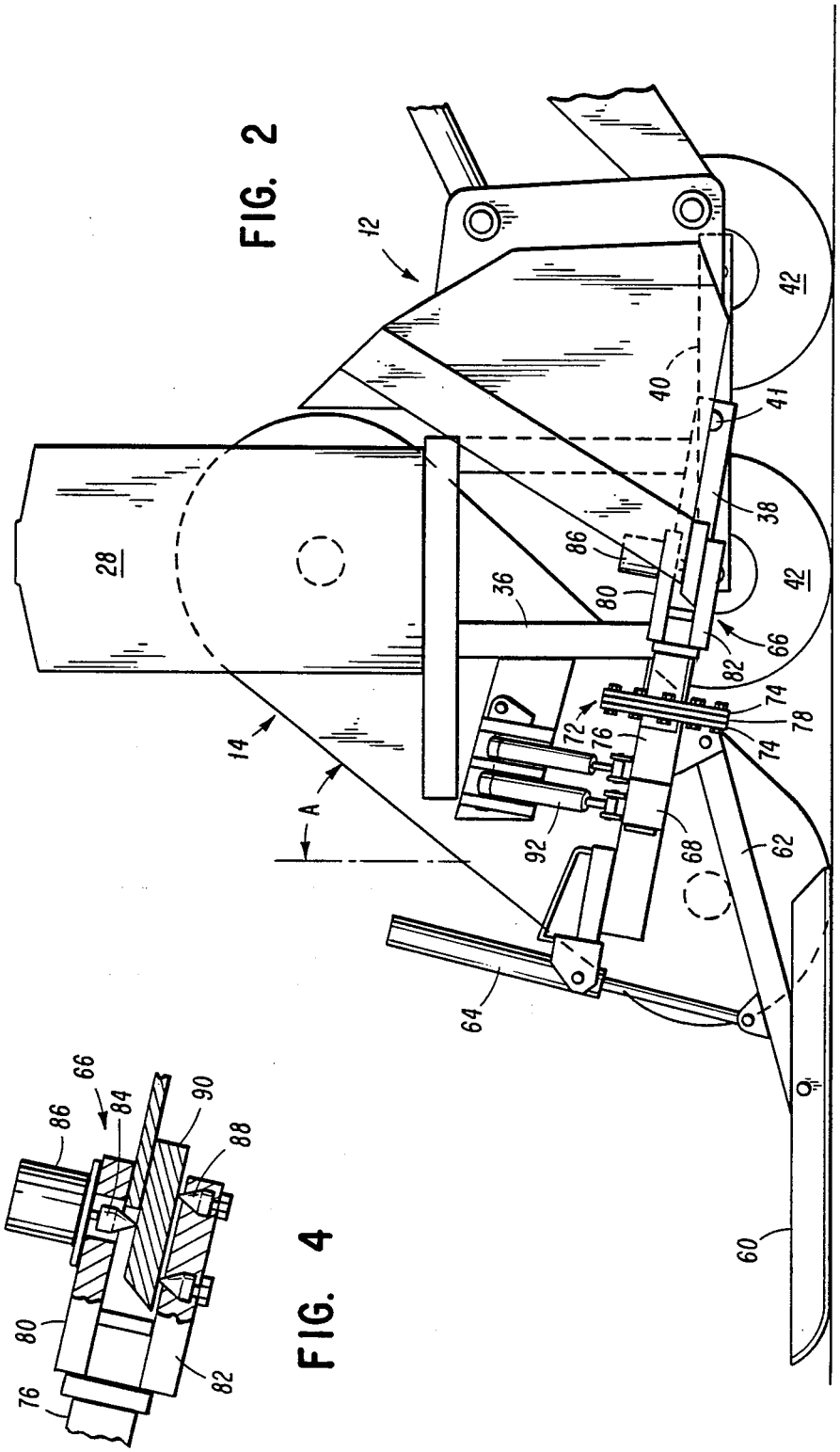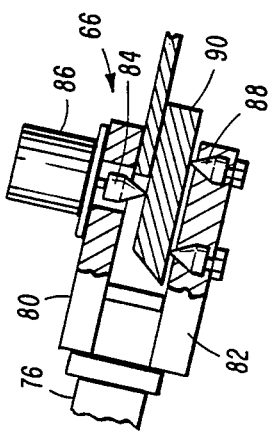

COMPOST WINDROW TURNER

BACKGROUND OF THE INVENTION

Composting is being used with increased frequency to convert tons of waste of all types, include solid waste, into valuable soil conditioners. Equipment is commercially available for treating the wastes and then windrowing the waste material. The rows of composted material then utilize the naturally occurring bacterial action of biologically digesting the organic materials. Since this natural process is aerobic, the composted material must be regularly mixed and aerated in order to avoid anaerobic cores that would otherwise form in the composted rows of material. If the composted materials are properly and periodically mixed and aerated, the waste materials will break down naturally and be converted into a finished material that is stable and relatively odorless and which can be used as soil conditioners.

There are available commercially a variety of machines for aerating and mixing compost piles stored in windrows. Many of these machines use a rotating drum with flails that will turn, mix and aerate the compost. In my co-pending U.S. patent application Ser. No. 265,879 filed Nov. 1, 1988, now U.S. Pat. No. 4,932,196, for a "Compost Windrow Turner", there is disclosed a multiple elevator machine for thoroughly mixing and inverting composted material. There is also known to me a machine that has a single elevating conveyor and which utilizes a double auger that feeds the material onto an elevating conveyor which then elevates all of the material and redeposits it. These machines are generally self-propelled, and are therefore relatively expensive, especially for the smaller operation. Usually, operators have available and use in the compost operation a tractor having a front mounted loader bucket. Obviously, it would be an advantage if this tractor could be utilized to move the compost windrow machine along the compost pile so as to aerate, mix and blend the composted material. The prior art does not disclose any machine which has the capability of being moved along the side of a compost pile by a separable prime mover which can be quickly and easily attached to the windrow machine. Particularly for the small operator, considerable savings can be achieved by utilizing the readily available tractor with its loader bucket to move and drive the compost windrow machine.

It is therefore an object of the invention to provide a compost windrow machine that can quickly and easily be attached to a prime mover, such as a tractor and controlled from the tractor to shred, aerate, mix and blend the composted material by moving the machine through the composted rows of the material.

It is a further object of the invention to provide a compost windrow machine that is low in cost and easy to maintain without sacrificing the effectiveness of the machine to properly mix, aerate and blend the composted material.

It is a further object of the invention to provide a machine which can handle the increasingly troublesome problem of leaves, grass and other wastes which are bagged in plastic bags by providing a simple and effective mechanism for cutting the bags open and separating them from their contents.

SUMMARY OF THE INVENTION

The invention consists of a single endless conveyor or elevator that utilizes a plurality of horizontally disposed slats and teeth to pick up the waste material, elevate it and deposit it directly behind the machine. As the material is elevated, it is mixed and aerated. The elevator is supported on a main frame, and to one side the frame supports a floating and adjustable clamping mechanism that is hydraulically operated to grip the bucket of a loader. The entire machine is supported on running gear that is controlled by the operator from the loader cab so as to maintain the proper orientation of the elevator thereby preventing gouging into the soil surface beneath the windrow.

At the upper discharge end of the elevator, a plurality of adjustable vanes extend across the discharge path to assist in directing the material to the desired position behind the machine. If the machine is being used for waste material contained in plastic bags, the vanes can be replaced with a bag separator. It also may be necessary to use special cutting teeth on the elevator to assure that the plastic bags are cut open so that their contents can be deposited on the compost pile while the bags are separated and carried away from the compost.

BRIEF DESCRIPTION OF THE DRAWINGS

FIG. 2 is a side elevational view of the left side of the apparatus of the invention with some components removed for purpose clarity:

FIG. 4 is an enlarged side elevational view of the loader bucket clamping mechanism;

DESCRIPTION OF THE PREFERRED EMBODIMENTS OF THE INVENTION

Figure 1:
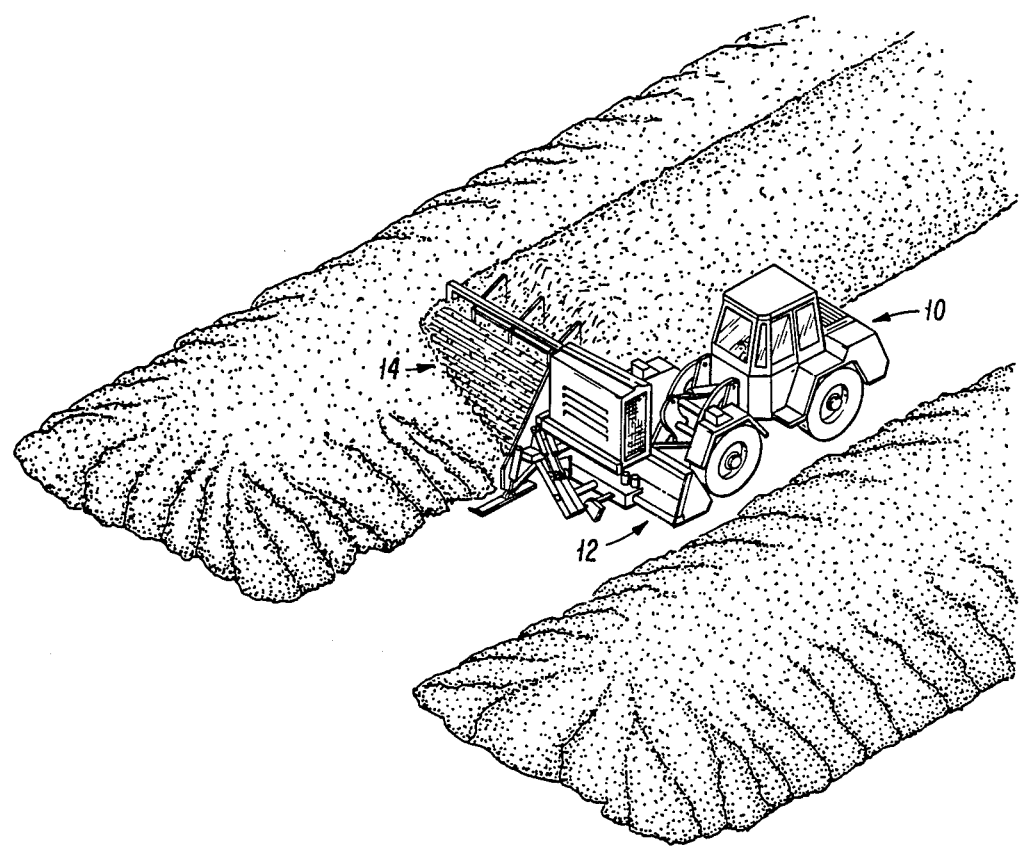
FIG. 1 is a perspective view showing the apparatus of the invention operating along a windrow.

Referring first to FIG. 1, there is illustrated an apparatus constructed according to the principles of the invention being pushed by a tractor 10 having a front-mounted loader bucket 12, the bucket being secured to the compost windrower in the manner described hereinafter. FIG. 1 illustrates the apparatus of the invention traveling along one side of a windrow of composted material, with the normal procedure being to move the apparatus along one side of the windrow and back on the other. In this manner, windrows up to 18 feet in width and 6 feet in height can be turned.

The compost windrower of the invention includes an elevator, indicated generally by the reference numeral 14, that is supported by a supporting frame that includes upper and lower frame members 18 which extend the full width of the elevator 14. The elevator includes a conveyor 16 having a plurality of horizontal slats 20 welded or otherwise affixed to endless chains 22 which are engagable with sprockets (not shown) mounted on a rotating shafts 24 that one of which is suitably connected through a clutch 26 to a power unit 28, such as a gasoline or diesel engine. Each of the slats 20 has affixed to it a plurality of teeth 30 which serve to shred, mix and blend the composted material.

The power unit 28 is supported on horizontal supports 32 that extend outwardly from the left side of the machine and are connected at their inner ends to a main horizontal frame member 34. The frame member 34 is welded or otherwise suitably affixed to vertical supports 36 which are joined at their lower end by a lower frame member 38. The lower frame member 18 is also welded or otherwise suitably affixed to the frame members 34 and 38 to form the supporting structure for the machine.

On the left side of the machine, a walking beam 40 (FIGS. 2 and 3) is pivotally connected by axle 41 to the lower frame member 38. Beam 40 has at its outer end wheels 42. This structure distributes the load and also facilitates moving of the machine over uneven ground.

On the right side of the machine directly behind the elevator 14 is a pair of wheels 44 (FIGS. 3 and 5) mounted on a common axle 46 that is secured to a trailing arm 48 the forward end of which is secured to a horizontal control rod 50 that extends the width of the elevator 14 just beneath the lower frame member 18. The control rod 50 is mounted on supports 52 so that it can turn and thus pivot the trailing arm 48 and wheels 44 upwardly and downwardly. The control rod 50 is connected at its leftmost end to an operating lever 54 the upper end of which is pivotally connected to the operating rod 56 of a hydraulic cylinder 58 that is pivotally secured to the vertical supports 36. Thus, when the hydraulic cylinder 58 is actuated, it will move the operating rod 54 and turn the control rod 50 to adjust the vertical position of the wheels 44. Also, the axle 46 for the wheels 44 is on the same center line as the axle 41 of the walking beam 40. By locating both axles 41 and 46 on the same center line, the elevator 14 can be raised and lowered by the operator by raising and lowering the bucket 12 in the manner described hereinafter. To adjust to uneven terrain or soft ground conditions, the vertical position of the wheels 44 relative to the wheels 42 is adjustable by operation of the hydraulic cylinder 58. Thus, the operator can maintain the elevator 14 in the proper alignment regardless of the terrain to prevent cutting away the soil surface beneath the windrow. Additionally, a skid shoe 60 may be provided. Skid shoe 60 is pivotally mounted on a supporting link 62 that extends rearwardly and is pivotally connected to the lower frame member 38. The skid shoe 60 is vertically adjustable by use of a hydraulic cylinder 64 that is pivotally mounted at the forward end of the frame member 38 as best seen in FIG. 2.

Figure 3:
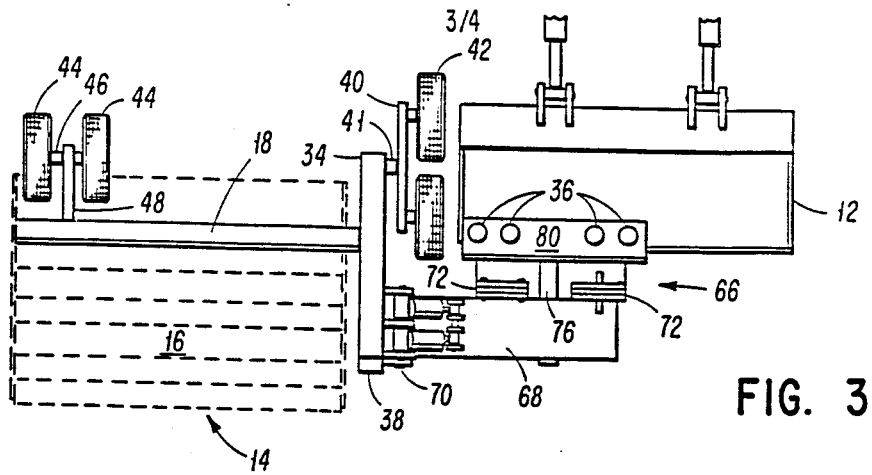
FIG. 3 is a top or plan view of the apparatus of the invention.
Figure 6:
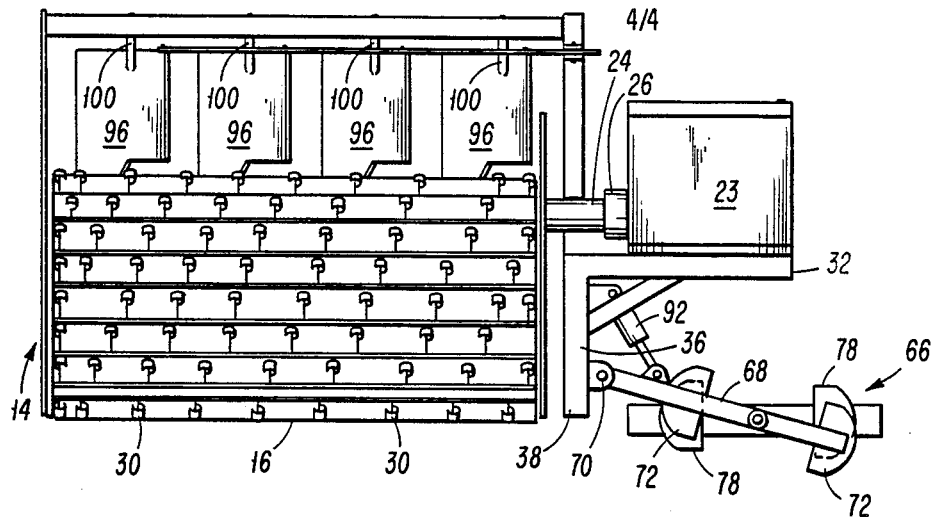
FIG. 6 is a front elevational view of the apparatus of the invention.

To provide connection of the compost windrow apparatus to the bucket 12 in a manner that will permit the operator of the tractor 10 to effectively move and control the windrow apparatus, a clamping device indicated generally by the reference 66 is mounted on the left side of the machine. As best seen in FIGS. 3, 4, and 6, a supporting arm 68 is pivotally connected by pins 70 to the frame member 38. At its outer end, there extends rearwardly a pair of spaced apart stabilizers 72 each of which consist of a pair of spaced apart vertical plates 74. Between the stabilizers 72 and extending rearwardly from the support arm 68 is the clamp support arm 76. Extending outwardly to the right and to the left of the clamp support arm 76 are stabilizer plates 78 which are sandwiched in between the stabilizer plates 74 and moveable relative to plates 74. At the rearmost end of the clamp support arm 76 are secured a pair of generally horizontally-extending clamp plates 80 and 82 which are vertically spaced apart. Upper clamp plate 80 has extending through it a plurality of grippers 84 each of which is connected to a hydraulic cylinder 86. Grippers are preferably provided with conical-shaped hardened tips. Similarly, clamp 82 contains a plurality of grippers 88 similarly provided with hardened tips, but grippers 88 are fixed in the lower clamp plate 82. Thus, when the lip 90 of the bucket 12 enters the space between the clamp plates 80 and 82, the hydraulic cylinders 86 are actuated by the operator to force the grippers 84 into the lip bucket 90 to tightly clamp the lip between the grippers 84 and the grippers 88. Since the grippers 84 and 88 have hardened points, they will actually slightly penetrate the surface of the lip 9 and firmly hold the bucket 12 in place. With the bucket 12 firmly held by the clamping device 66, the operator of the tractor 10 can then move the compost windrow machine forwardly, and with the engine 28 driving the elevator 14, the machine can be moved along one side of the row of composed material to pick up, aerate, mix and blend the material and redeposit it behind the machine. Since the clamping device 66 is mounted on pivot support arm 76, there are also provided a pair of hydraulic tilt cylinders 92 which are pivotally secured to one of the vertical supports 36 of the main frame, the operating rods of the tilt cylinders 92 being pivotally secured to the clamp support arm 76. The tilt cylinders 92 have a "float" position which allows the support arm 76 to pivot upwardly and downwardly within a limited range to compensate for uneven terrain. However, tilt cylinders 92 can be locked in a fixed position to allow the tractor 10 to pick up the entire machine and transport it or load it onto a carrier.

Also, because the clamp support arm 76 is pivotally mounted about a generally horizontal axis in the direction of travel of the machine, differences between the terrain over which the tractor 10 is traveling and the terrain over which the compost windrower machine is traveling are compensated for by allowing the entire clamping device 66 to pivot freely about the support arm 76. The stabilizer plates 72 and 78 provide the necessary rigidity and strength to allow the free pivotal movement without affecting the ability of the tractor 10 to move and operate the compost windrower machine.

Figure 5:
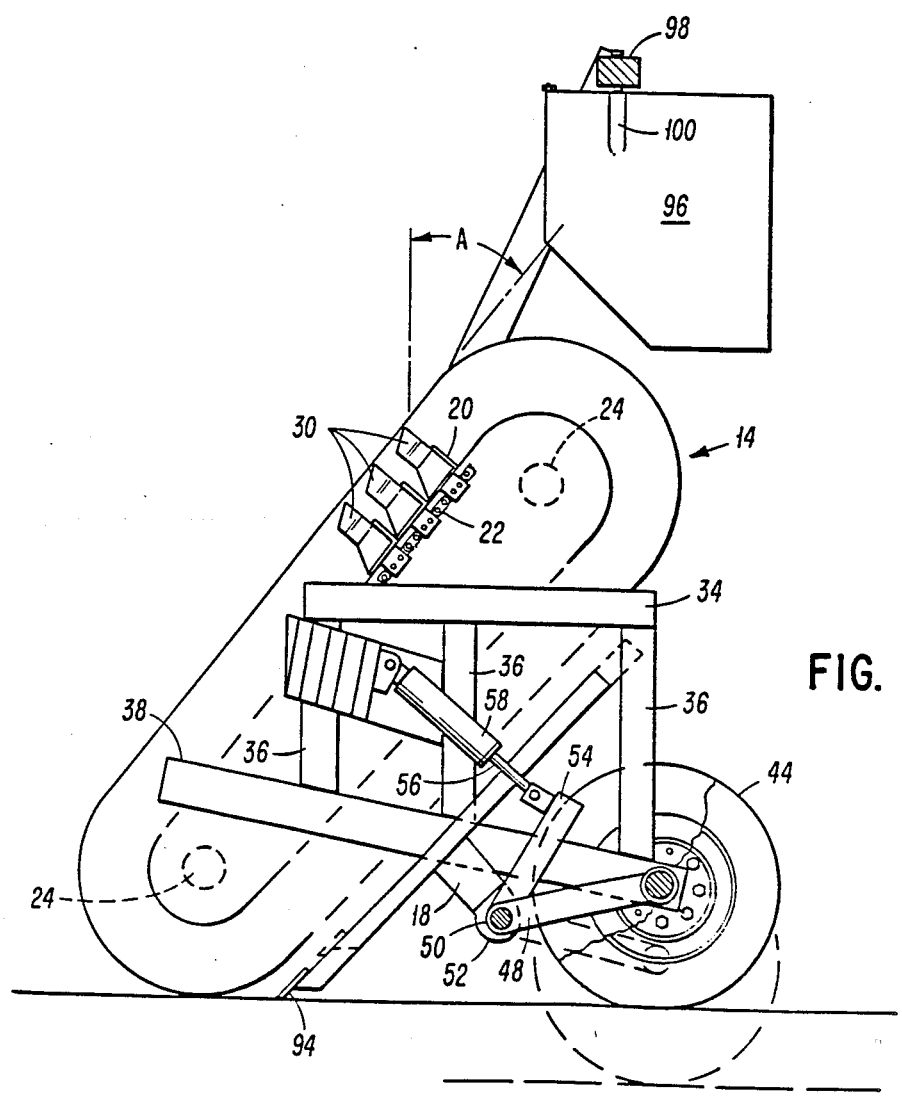
FIG. 5 is a side elevational view viewing the apparatus from the left side but with many of the components on the left side removed to illustrate the support and action of the outer wheel on the of the apparatus.

FIG. 5 also shows a crumber 94 that serves to pick up and feed any excess material missed by elevator 14 thereby assuring that substantially all of the composted material is aerated and mixed by the elevator 14.

Also, to provide for some control over the aerated and blended composted material as it is discharged at the upper end of the elevator 14, there may be provided a plurality of discharge vanes 96 which are supported by a frame member 98 secured to the upper frame member 16. Each of the discharge vanes 96 is secured to a vertical rod 100 that is pivotally mounted on frame 98 so that the vanes can be turned to the desired angle to direct the composted material as desired by the operator. The rods 100 are shown as being offset from the center of discharge vanes 96, and if desired, suitable stops (not shown) can be provided to limit the maximum angle to which the vanes could be turned. Although not shown, all of the vanes 96 could be connected by a suitable operating rod so that they will always remain parallel to each other and can be moved simultaneously by movement of a single rod.

Figure 7:
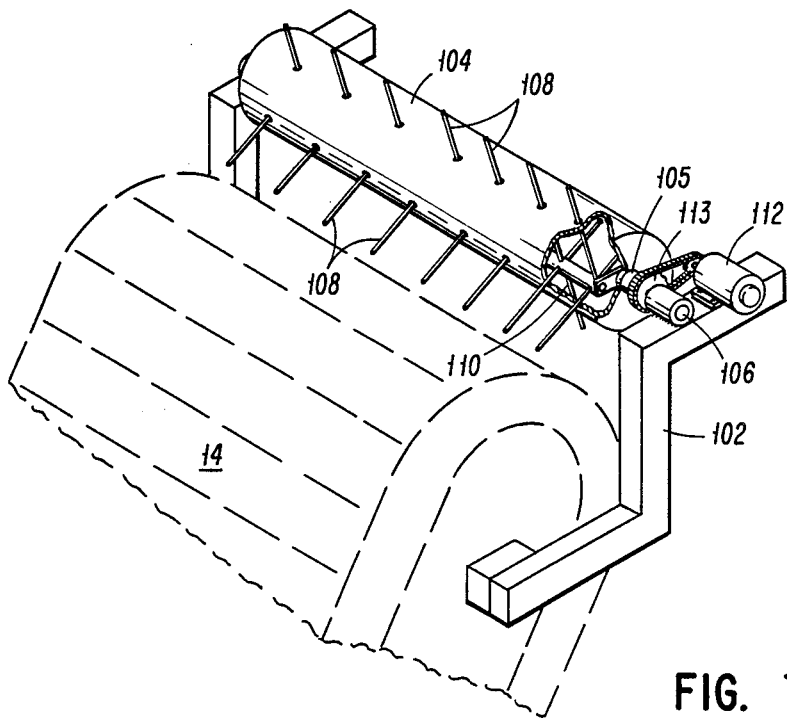
FIG. 7 is a perspective view showing the leaf separator attachment.

FIG. 7 illustrates an attachment that is very useful in most instances. Traditionally, yard and garden waste, especially leave and grass clippings are placed in plastic trash bags. This has become an easy method to facilitate trash collection. However, plastic bags in compost piles are not desirable, but the contents of leaves and grass clippings are desirable. The attachment illustrated in FIG. 7 provides a quick and efficient way of separating the plastic bags from their contents. The plastic bags are first piled on the ground, preferably three to four feet deep, and the windrow machine driven forward into the pile of bags. The teeth 30 on the elevator 40 preferably have a sharpened cutting edge so that as the plastic bags are engaged by the elevator 14, the teeth 30 would slice open the bags as they are carried upwardly by the elevator 14. As the bags are sliced open, the contents are raised by the slats 20 and discharged over the top of the elevator 14. To separate the bags, a frame member 102 supports a revolving drum 104 that has a bearing 105 affixed to it, which bearing turns on a shaft 106 fixed to the frame member 102. The axis of rotation of drum 104 is parallel to the axis of rotation of sprockets 24 that drive the elevator 14. Since the drum 104 is positioned just above and slightly to the rear of the top of elevator 14, the plastic bags will be carried onto the drum 104. To pick up the plastic bags and separate them from their contents, drum 104 is provided with a plurality of openings through which extend tines 108 that extend radially outwardly from and are mounted on a shaft 110 by bushings (not shown) that permit the tines 108 to turn relative to shaft 110. The axis of shaft 110 is eccentrically mounted relative to the axis of drum 104, and shaft 110 is fixed relative to drum 104 by connection to shaft 106. A suitable power unit 112, which could be a hydraulic motor, for example, drives a sprocket 113 affixed to bearing 105, thus turning drum 104. Alternatively, the drum 104 could be driven by the main power unit 28 of the machine. Because the shafts 106 and 110 are eccentrically mounted, the tines 110 are fully extended from drum 104 as the drum 104 moves past the top of elevator 14. As drum 104 continues to rotate, the tines 108 will retract into the drum and be fully retracted at the rear of drum 104. This action allows the tines to pick up the plastic bags out of the material flow at the discharge end of the elevator 14 and carry the bags rearwardly while the contents of the bags are discharged downwardly and redeposited on the ground behind the machine. The action of the tines retracting into the drum 104 allows the bags to fall off the drum 104 at the rear of the drum 104 where they can be deposited into a hopper (not shown) or onto a suitable conveyor (not shown) that would carry the bags off to the side of the machine away from the composted material.

All hydraulic cylinders used in the machine are preferably controlled by connection to the hydraulic system of the power unit 28. A separate remote and portable control panel (not shown) can be provided so the operator can easily control all operations from the operator's position on the tractor 10.

The operation of the compost windrow machine should be evident from the foregoing description. However, the operation is briefly summarized as follows. The tractor 10 is driven into position so that its bucket loader 12 enters the clamping device 66. By actuating the hydraulic cylinders 86, the bucket lip 90 is firmly gripped in the clamping device 66. The operator of the tractor can then lock the tilt cylinders 92 and raise the entire windrow machine and transport it to the desired site along one side of a row of composted material. The operator then lowers the bucket 12 until the compost windrow machine rests on its wheels 42 and 44. With the power unit 28 running and the clutch 26 engaged so that the elevator 14 is operating, the operator of the tractor 10 then moves the machine along one side of the windrow of composted material. The elevator 14 will pick up the material, mix and blend it while at the same time aerating the material which is then discharged over the top of the elevator 14 and redeposited on the ground behind the machine. If the terrain is uneven, the operator can compensate by raising or lowering the right wheels 44 in the manner previously described. Also, the floating action of the tilt cylinders 92 and hinged construction of the clamping device suport structure will compensate for differences in the terrain over which the machine and the tractor 10 are traveling. The walking beam arrangement for wheels 42 also serves to compensate for terrain differences. The vanes 96 positioned above the discharge end of elevator 14 can be positioned by the operator so as to direct the composted material directly rearwardly or probably slightly to the right of the machine. If plastic bags containing trash are encountered, these should be separated into a separate pile and the machine driven into the pile to slice open the bags and separate the plastic bags from their contents using the attachment illustrated in FIG. 7.

From the foregoing description, it is evident that the machine of the invention provides a simple and relatively inexpensive apparatus for any size operation in which composted material is windrowed. The apparatus of the invention is simple to operate and to maintain. It provides a cost effective way to efficiently aerate, mix and blend the composted material since the unit does not require its own prime mover but can be quickly and easily attached to a bucket loader. In addition, with a very simple modification, the unit can be provided with a tow bar connected to the main frame members so that the unit can be towed rather than pushed. The basic design of the unit is thus adaptable to many and varied situations, and although the invention has been described in connection with certain preferred embodiments, it will be evident to those skilled in the art that various revisions and modifications can be made to the embodiments without departing from the spirit and scope of the invention. It is therefore my intention that all such revisions and modifications as would be obvious to those skilled in the art will be included within the scope of the following claims.

What is claimed is as follows:

1. An apparatus movable by a prime mover having a loader bucket for treating collected waste material that is stored on the ground, said apparatus comprising an elevator conveyor for picking up the waste material and elevating it as the conveyor is moved forwardly, said conveyor including a plurality of teeth for shredding and mixing the material as it is elevated, a frame for supporting said conveyor, ground engaging wheels supporting the frame, and attachment means connected to the frame along one side of the conveyor and providing for removable attachment of the loader bucket of the prime mover to the apparatus, said attachment means includes a support arm connected to the frame and extending outwardly to one side, a pair of vertically spaced-apart clamping plates carried by the support arm, and gripping means extending inwardly from each of the clamping plates, the gripping means on one of the plates being movable toward and away from the other plate to selectively grip and release the loader bucket of the prime mover.

2. The apparatus of claim 1 in which the gripping means includes a plurality of hardened members capable of penetrating the surface of the loader bucket, and hydraulic cylinders are operatively connected tot he hardened members of one of the clamping plates for moving the members into and out of contact with the loader bucket.

3. The apparatus of claim 2 in which the support arm is pivotally mounted on the frame, and a hydraulic cylinder is connected between the frame and the support arm to control pivotal movement of the support arm.

4. The apparatus of claim 1 in which a wheel support beam is pivotally connected at its center to the frame on one side of the apparatus, and the ground engaging wheels on that side of the apparatus are supported at opposite ends of the beam.

5. The apparatus of claim 4 in which there are ground engaging wheels on the other side of the frame, a turnable operating rod supports the ground engaging wheels for pivotal movement about the rod upwardly and downwardly, and hydraulic means controls the movement of the operating rod.

6. The apparatus of claim 1 in which there is provided at the discharge end of the elevator conveyor a means for separating plastic bags from their contents, the teeth on the elevator conveyor cutting open the bags as they are elevated to the discharge end of the conveyor.

7. The apparatus of claim 6 in which the means for separating plastic bags from their contents includes a revolving drum, and a plurality of fingers extend outwardly from the drum, the fingers being movable toward and away from the surface of the drum so as to pick up the plastic bags as they are discharged from the conveyor and carry them rearwardly where they are released by the fingers.

8. An apparatus movable by a prime mover for treating collected waste material that is stored on the ground, said apparatus comprising an elevator having a plurality of horizontal slats forming an endless movable conveyor and presenting an inclined face for picking up the waste material, elevating it as the conveyor is moved forwardly and discharging the material over the top of the elevator, said conveyor including a plurality of teeth combined with the slats for shredding and mixing the material as it is elevated, power means for moving the conveyor frame for supporting said conveyor, means combined with the upper end of the conveyor for directing at least a portion of the waste material being discharged at the top of the elevator toward one side of the apparatus, ground engaging wheels supporting the frame, and means at the discharge end of the elevator conveyor for separating plastic bags from their contents, the teeth on the elevator conveyor cutting open the bags as they are elevated to the discharge end of the conveyor.

9. The apparatus of claim 8, in which the means for separating plastic bags from their contents includes a revolving drum, and a plurality of fingers extend outwardly from the drum, the fingers being movable toward and away from the surface of the drum so as to pick up the plastic bags as they are discharged from the conveyor and carry them rearwardly where they are released by the fingers.

* * * * *